March 8, 1966 V. J. JANDASEK 3,239,042
CLUTCH WITH FRICTION INCREASING MEANS
Filed April 17, 1963
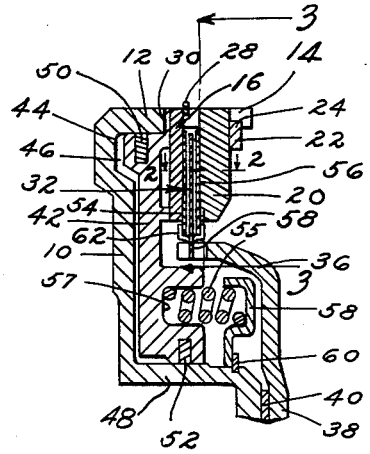
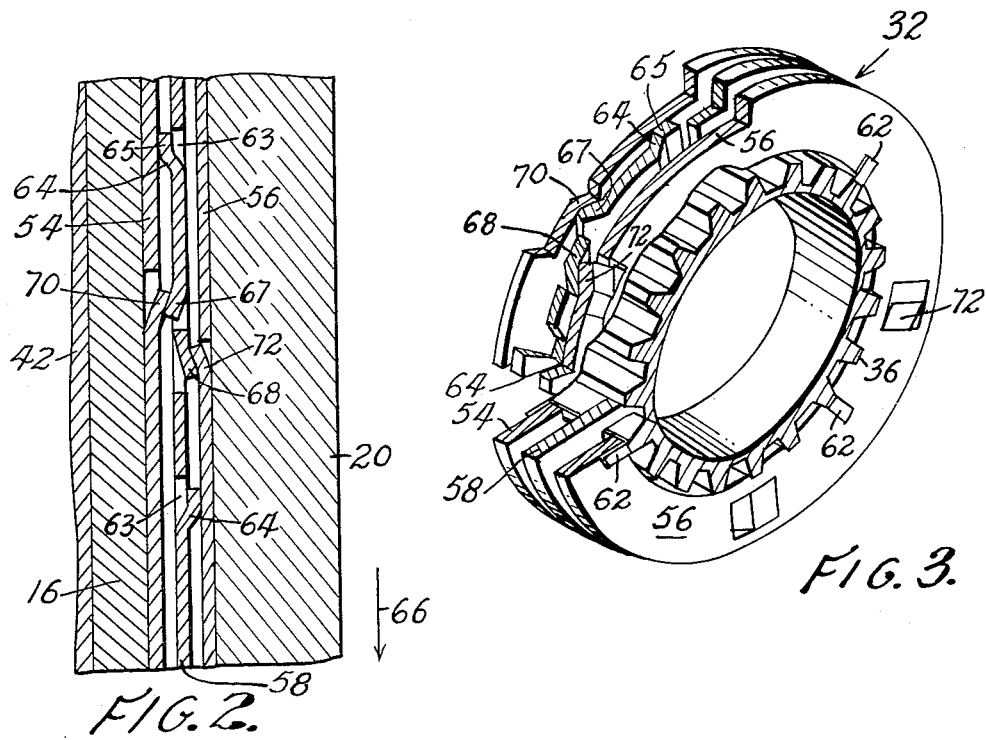
VLADIMIR J. JANDASEK
INVENTOR.
BY John R. Faulkner
Robert E. McCollum
ATTORNEYS

United States Patent Office 3,239,042
Patented Mar. 8, 1966

3,239,042
CLUTCH WITH FRICTION INCREASING MEANS
Vladimir J. Jandasek, Dearborn, Mich., assignor to Ford Motor Company, Dearborn, Mich., a corporation of Delaware
Filed Apr. 17, 1963, Ser. No. 273,653
2 Claims. (Cl. 192—32)

This invention relates to a friction coupling, such as, for example, a friction disc clutch or brake. More particularly, it relates to a friction coupling having unidirectional self-energizing means to prevent slip between the members. The coupling is of a construction such that initial engagement of the friction members, during application of torque in one direction, triggers the operation of a number of coupling components to apply coupling engaging forces varying in proportion to the valve of torque to be transmitted to prevent relative rotation between these members. These components become ineffective upon a reversal in the direction of torque delivery, such as during a coast condition.

An object of the invention, therefore, is to provide a friction coupling construction that is effective under varying torque loads to prevent relative rotation between a plurality of friction members.

Another object of the invention is to construct a friction coupling that has unidirectional self-energizing means for increasing the coupling engaging forces in proportion to the torque differential between the members as sensed by relative rotational tendency or slippage therebetween in one direction, and permits overrun between the members upon a reversal in the relative direction of rotation.

A further object of the invention is to provide a friction coupling with cam means effective upon relative rotation between the members in one direction, after initial engagement, to apply additional engaging forces on said members, the cam means consisting of cooperating bent tabs having ramp portions slidable upon each other to provide axial thrust forces moving the friction members into tight engagement with each other.

Another object of the invention is to provide a unidirectional self-energized friction coupling that is simple in construction, is readily adaptable to known constructions, and can be used with infinite multiples of friction members, thereby rendering it useful over very wide torque ranges.

Other objects, features and advantages of the invention will become apparent by reference to the succeeding, detailed description thereof, and to the drawings illustrating the preferred embodiment thereof; wherein, FIGURE 1 is a cross-sectional view of a friction coupling embodying the invention;

FIGURE 2 is an enlarged cross-sectional view of a circumferential section of FIGURE 1 taken on a plane indicated by and viewed in the direction of the arrows 2—2 of FIGURE 1; and FIGURE 3 is an enlarged perspective view of a detail of FIGURE 1, with parts broken away and in section, taken in general on a plane indicated by and viewed in the direction of the arrows 3—3 of FIGURE 1.

FIGURE 1 shows a typical friction coupling installation in which the invention is embodied, which, in this case, is a clutch to engage two members for rotation as a unit. It would, however, have equal application as a brake, as a matter of choice, to prevent rotation of the members. The figure shows a first annular rotating member 10 having a drum-like outer flange 12. The flange has internal splines 14 on which are mounted an annular friction disc 16 and an annular backing or pressure plate 20. Plate 20 is located axially against a snap ring 22 fitted into a groove 24 on the spline. The disc 16 has a limited axial slidable movement on spline 14, for a purpose to be described, moving between a snap ring or stop 28 and the inner end 30 of the spline.

Positioned between disc 16 and the backing plate 20 is a cooperating driven annular friction disc illustrated as a whole at 32. Disc 32 is of a laminated construction, constructed according to the invention, as will be described, and is internally splined to the drum-like flange 36 of a rotatable member 38. A suitable thrust washer 40 separates the members 10 and 38 to permit relative rotation therebetween.

The discs 16 and 32 and plate 20 are engaged by an annular piston 42 to rotate as a unit. The piston is received in a recess 44 in the member 10, the space between defining a chamber 46 receiving fluid under pressure from a source, not shown, through a bore 48 in member 10. Suitable seals 50 and 52 prevent the escape of fluid from the chamber. The piston is biased to a disc nonengaging position by a spring 54 seated at one end in a pocket 56 in the piston, and at its opposite end against a cup-shaped retainer 58. The retainer extends from member 10 and is axially fixed against a snap ring 60.

As thus far described, movement of piston 42 axially until disc 16 abuts stop 28, clamps disc 32 against pressure plate 20 with an initial engaging force. The stop 28 limits this force to a predetermined amount, for a purpose which will become clear later.

While only one set of cooperating friction members is shown, the number would be a matter of choice, and more could be used, if desired, depending upon the torque requirements.

FIGURE 2 shows a cutaway view of a circumferential edge of the disc members 16 and 32 and piston 42 and pressure plate 20, and FIGURE 3 shows disc 32 in perspective, with parts cutaway and in section.

As shown in both FIGURES 1 and 2, the friction disc 32 has a laminated construction consisting of a pair of freely rotatable, driven friction discs or plates 54 and 56 on opposite sides of a driven annular plate 58. Plate 58 is internally splined to the flange 36 of an axial extension of member 38. That is, the inner periphery of plate 58 is provided with circumferentially spaced teeth that extend inwardly into the slots between the splines on hub member 36. The discs 54 and 56 are of an internal diameter to clear the splines on hub 36, and are floatingly located at their inner edges between a number of circumferentially spaced retaining flanges 62. The retaining flanges 62 (see FIGURE 3) can be in the form of substantially U-shaped spring clips (three spaced 120° apart) each of which seat on top of a spline of driven hub 36 and in a slot at the bottom of the space between two adjacent teeth on the disc 58. The radical side portions of the retainers act as stops for the axial movement of plates 56 and 54 to prevent rattling. Discs 54 and 56 are lined with a suitable friction material for cooperating with disc 16 and backing member 20.

Plate 58 is initially slotted at a number of circumferentially spaced locations 63 to provide finger like tab portions 64 substantially U-shaped in cross section. These tab portions are pushed or bent outwardly from the plate and shaped as shown so as to have an edge portion 65 substantially parallel to but offset laterally with respect to the radial plane of plate 58. The tabs are resilient and act as spring members so that, when compressed by the engaging movement of piston 42, they provide reaction forces effecting an initial engagement between the driving discs 16 and 20, driven discs 54 and 56, and plate 58. Circumferentially adjacent tabs are bent outwardly from opposite sides of the plate so as to cooperate with both discs 54 and 56. Furthermore, they extend in directions opposite to that of the normal direction of rotation of member 10, which is in the direction of arrow 66.

The lateral or axial projection of the tabs is such that the uncompressed or free positions of the tabs locates plates 54 and 56 against the radial side portions of retaining flanges 62, thereby eliminating rattling.

Plate 58 is provided with a set of energizing or camming tabs 67 and 68 located circumferentially between each pair of adjacent tabs 64. These tabs extend laterally from opposite sides of plate 58, and in directions opposite to that of tabs 64. The tabs 67 and 68 are each provided with ramp surfaces or faces adapted to cooperate with mating faces on similarly shaped but oppositely directed tabs 70 and 72 extending from the lined plates 54 and 56. The assembly is such that the ramp surfaces of the tabs 70, 67, and 68, 72 move circumferentially towards each other to axially spread plates 54 and 56 away from plate 58 upon relative rotation between the plates in one direction, and move circumferentially away from each other upon a reversal in the direction of relative rotation. That is, movement of plates 54 and 56 in the direction of arrow 66 relative to plate 58 cause tabs 70 and 72 to ride up on tabs 67 and 68 thereby forcing the plates 54 and 56 axially into tighter engagement with disc 16 and backing plate 20 and plate 58, to stop relative rotation between the plates and discs. The reaction for these forces is taken by the snap ring 22 and the increase in the fluid pressure acting against piston 42 preventing regressive movement of the piston and disc 16.

This it will be seen that the additional axial camming forces will vary in proportion to the degree of slip between the plates in one direction as determined by the torque load applied. Conversely, rotation of plates 54 and 56 in a direction opposite to that indicated by arrow 66, such as would occur during a coasting condition when plate 58 becomes the driver, causes tabs 67 and 68 to move circumferentially away from tabs 70 and 72 until stopped by abutment of the edges of tabs 70 and 72 against the shoulders of tabs 64, thus cancelling out any effect due to the cam tabs. Relative rotation is still prevented, however, under these circumstances, due to the forces induced by compression of the tabs 64. That is, the axial projection of each of the tabs 70, 67, and 68, 72 is less than that of the tabs 64 so that during overrun, when the cam tabs are separated, the forces provided by the compression of tabs 64 maintains the clutch engaged.

It is believed the invention will be clear from a description of its operation. In the disengaged position (not shown) of the clutch or brake, spring 54 moves piston 42 to its inoperative position out of engagement with disc 16, and the disc is moved against the end 30 of splines 14 by any suitable means, not shown, such as wave springs. The natural resiliency of tabs 64 moves driven plates 54 and 56 against the radially extending sides of retaining flanges 62, thereby positioning tabs 70 and 72 in an overlapping but non-abutting relationship with tabs 67 and 68. The abutment of plates 54 and 56 against the flange stops 62 therefore provides a running clearance between the plates and the disc 16 and pressure plate 20.

Assume now, for example, that member 10 is rotated in the direction of arrow 66, and member 36 remains stationary or is rotated at a slower speed. Introduction of fluid under pressure through bore 43 to chamber 46 moves piston 42 against disc 16, which then moves into contact with driven plate 54. Continued movement of the piston and disc engages tabs 64 with plates 54 and 56, compressing the tabs until disc 16 abuts snap ring 28. At this time, the spring load provided by the tabs 64 loads plates 54, 56 and 58 and disc 16 and pressure member 20 together with an initial force as determined by the position of snap ring 28. The friction linings on plates 54 and 56 cause them to rotate with disc 16 and member 20. With a torque load impressed on these plates and discs greater than the frictional resistance offered by the engagement of tabs 64 with the opposite sides of the plates, relative rotation will occur between the plates and tabs 64, thus causing cooperating tabs 70, 67 and 72, 68 to engage or ride up on each other. This causes plates 54 and 56 to be spread apart from plate 58 resulting in a tight engagement between all of the members. Relative rotation between the plates 54, 56 and 58 and discs 16 and 20 is therefore prevented. It will be clear of course, that the fluid pressure in apply chamber 46 will be increased proportionately to enable the disc 16 to provide the reaction for these additional forces. It will also be clear that the additional axial forces caused by this camming action will progressively increase or decrease with a change in the level of torque load, as required to maintain zero relative rotation between the parts.

Assume now, for example, that the torque load is released from member 10, and that the clutch or brake pack attains a coast condition. At the instant the speed of member 36 becomes greater than that of member 10, the forward (arrow 66) rotation of plate 58 relative to plates 54 and 56 will cause a circumferential separation of tabs 67, 68 from tabs 70, 72, thus eliminating the additional axial clutch engaging forces previously induced. The tabs 67 and 68 will then move circumferentially with plate 58 until stopped by abutment of the edge of tabs 70, 72 against the shoulders of tabs 64. Under substantially zero or very light torque loads, therefore, the spring force exerted by tabs 64 is sufficient to maintain the clutch pack engaged.

To disengage the clutch, fluid pressure is vented from chamber 46, permitting the springs previously described to return piston 42 to an inoperative position and move disc 16 against the end 30 of spline 14. This movement thus separates the disc and backing member 20 from the plates 54 and 56, which are stopped in their axial movement by the retaining flanges 62. The tabs 64 are unloaded, and relative rotation can occur freely between discs 16 and 20 and plates 54 and 56.

From the foregoing, therefore, it will be seen that the invention provides a friction coupling having a unidirectional self-energizing action to prevent slip, solely by means of a simple mechanical construction, and one that provides friction disc engaging forces that vary automatically in proportion to the change in direction and application of torque loads. It will also be seen that the friction coupling has use in many installations other than that shown, where a clutch or brake construction of this type is desired.

While the invention has been illustrated in its preferred embodiment, it will be clear to those skilled in the arts to which the invention pertains, that many changes and modifications may be made thereto without departing from the scope of the invention.

I claim:

1. A friction coupling comprising axially aligned and adjacent engageable friction members mounted for a relative rotation therebetween, means to initially frictionally engage said members to prevent relative rotation therebetween, and cam means on said members responsive to subsequent relative rotation between said members to wedge said members into tighter engagement with each other, said cam means including resilient bent tab portions projecting laterally in opposite directions from portions of said members, mutually adjacent bent tab portions frictionally abutting each other in wedging relationship upon engagement of said members, subsequent relative rotation of said members providing camming of said abutting bent tab portions on each other to axially move said members into tighter engagement with each other thereby resisting relative rotation therebetween.

2. A self-energizing friction coupling comprising an axially slidable parallel pair of first annular friction members, a second axially slidable friction member disposed between said pair in parallel relationship, means for engaging said members to prevent relative rotation therebetween, and means secured to said second member for increasing the effective engagement between said members in response to relative rotation therebetween, said latter means comprising a plurality of spaced annular plates each having bent resilient cam portions extending laterally therefrom into the space between said plates, each of said cam portions having an inclined cam surface thereon in one direction of rotation of one of said members relative to the other cooperating with the cam surface of an adjacent plate bent cam portion to cam the said plates laterally apart thereby increasing the engagement between said members, said cooperating cam surfaces becoming separated upon rotation of said one member in the opposite direction relative to the other members to render said cam action ineffective.

References Cited by the Examiner

UNITED STATES PATENTS

| | | | |
|---|---|---|---|
| 1,906,733 | 5/1933 | Bendix | 192—32 |
| 2,035,916 | 3/1936 | Pope | 192—52 |
| 2,050,426 | 8/1936 | Dolan | 192—52 |
| 2,122,218 | 6/1938 | Sneed | 192—32 |
| 2,136,063 | 11/1938 | Swennes | 192—32 |
| 2,807,172 | 9/1957 | Jacobs | 192—32 |

OTHER REFERENCES

Mueller: 1,127,157, Apr. 5, 1962 (German printed application).

DAVID J. WILLIAMOWSKY, *Primary Examiner.*